United States Patent [19]

Biegasnki

[11] Patent Number: 4,768,404
[45] Date of Patent: Sep. 6, 1988

[54] CABLE STRIPPING TOOL
[75] Inventor: Zdzislaw Biegasnki, Herts, England
[73] Assignee: Abeco Limited, Bedfordshire, England
[21] Appl. No.: 72,350
[22] Filed: Jul. 10, 1987
[30] Foreign Application Priority Data Jul. 15, 1986 [GB] United Kingdom ............... 8617249

[51] Int. Cl.4 .................................................. H02G 1/12
[52] U.S. Cl. ...................................................... 81/9.43
[58] Field of Search ...................... 81/9.41, 9.43, 9.4, 81/9.42

[56] References Cited

U.S. PATENT DOCUMENTS 4,072,069 2/1978 Bieganski ........................ 81/9.43
4,485,696 12/1984 Bieganski ........................ 81/9.41

Primary Examiner—Roscoe V. Parker
Attorney, Agent, or Firm—C. O. Marshall, Jr.

[57] ABSTRACT

A tool has outer gripping jaws 12, 19 to grip a cable 20, and inner jaws with cutting edges 30 which penetrate the cable.

The inner jaws are initially located for sheath penetration and are then displaced axially to strip the cut portion of the sheath of the core of the cable. In the axial movement the inner jaws are guided along tracks on the adjacent faces of the outer jaws and at least one of these tracks 100 is relieved at 102 so that during the axial movement the cutting jaws separate. This enables the tool to operate satisfactory even when the jaws converge towards the axis on which they are pivoted.

2 Claims, 2 Drawing Sheets

CABLE STRIPPING TOOL

This invention relates to tools for stripping cables of the kind essentially comprising a pair of outer jaws arranged to be closed together to grip the outer sheath of the cable, and a pair of inner jaws which are located between the outer jaws so that they are closed and held together by the outer jaws. The inner jaws are provided with cutting edges which penetrate the outer sheath when the jaws are closed together, and are also provided with a mechanism for displacing them relative to the outer jaws, whilst the outer jaws are held in the closed position thus maintaining the inner jaws likewise, and this axial displacement pulls a portion of the sheath along the cable relative to the core thus effecting the stripping.

Tools of the kind referred to are well known and many different designs have been proposed. BP-No. 1164184 is an illustrative example.

A tool of this kind works best with a cable of particular dimensions although it can be used with cables which are of different dimensions, within limits. The object of the present invention is to provide a tool of this kind capable of dealing with cables over a much wider range of sizes—that is to say to widen said limits.

According to the present invention a tool of the kind referred to has at least one of the outer jaws provided with a surface confronting the inner jaws and upon which the inner jaws slide in the displacing movement, which surface is at a first distance from the axis of the cable near the gripping jaws and at a second and greater distance therefrom remote from said gripping jaws.

The invention will be better understood from consideration of the following description with reference to the accompanying drawings wherein.

Figure 1:
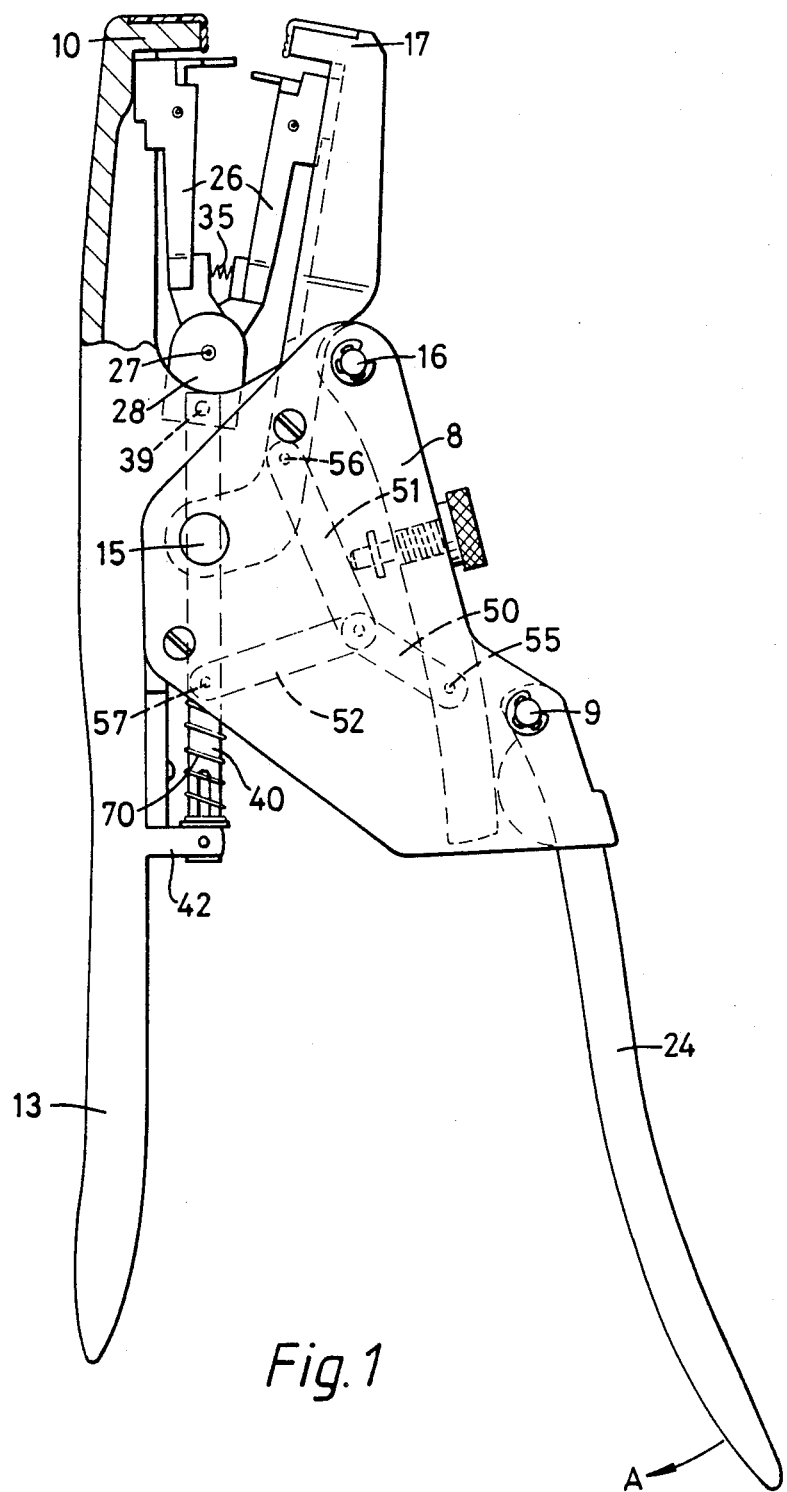
FIG. 1 is a part-sectional elevation.

The tool, FIG. 1, comprises a first outer jaw 10 and a second outer jaw 17 which are pivoted together on pin 15. A pair of lever handles 13 and 24 are provided and a three link toggle 50, 51, 52 is pivoted respectively to the outer jaw 17 at 56, the lever system at 55, and to a tie rod 40 at 57.

In this embodiment, lever handle 24 is pivoted on pin 9 and a further lever 8 is pivoted on pin 16. Movement of handle 24 in the direction of arrow A displaces the lever 8 in the same direction. Link 50 is pivoted to lever 8. The effect is the same as if levers 24 and 8 were unitary and pivoted on pin 16 but with mechanical advantage which is useful in dealing with thick cables whilst enabling the tool to be operated by the fingers of one hand only.

The inner jaws 26 and 26 are pivoted together at 27, urged apart by a spring 35, and tied via a clevis 28 and a coupling pin 39 to the rod 40 which is generally guided for axial movement in a bore in pin 15 and an aligned bore in the lug 42. Return spring 70 acts between the lug 42 and the link 52.

Figure 2:
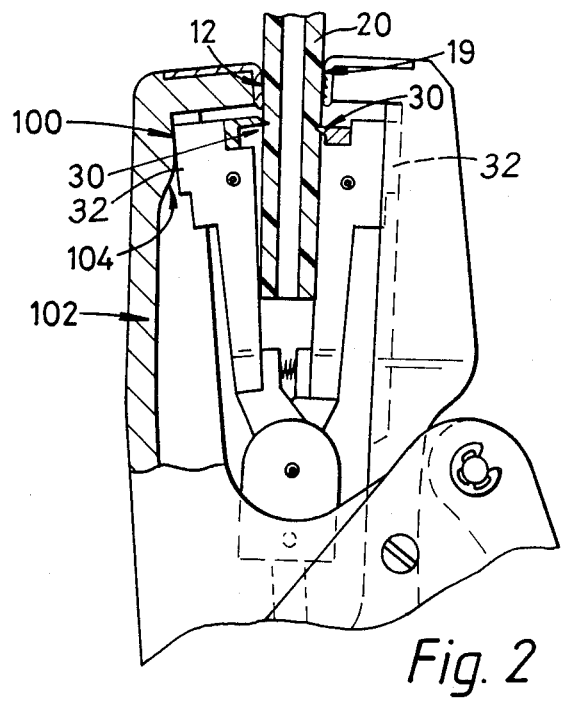
FIGS. 2 and 3 are fragmentary views of the tool in use.

When a cable 20 (FIG. 2) is placed in the tool as shown, and the handles 13 24 are moved together, the outer jaws (at 12 and 19) grip the outer sheath of the cable, and the inner jaws (at 30) cut into the sheath. At a certain point in the closing movement of the handles, the inner jaws are axially displaced by the tie rod.

The inner jaws are shown with parts 32 which are received in shallow grooves extending along the length of the confronting surface of the outer jaws. These grooves serve as tracks to guide the inner jaws in their movement.

At least one of the outer jaws is provided with a track having three successive portions namely portion 100, portion 102 which is parallel with portion 100 but located at a greater distance from the displacement axis of movement of rod 40, and a third portion or step 104 which is inclined and extends between the portions 100 and 102. Either or both outer jaws may be so formed.

Figure 3:
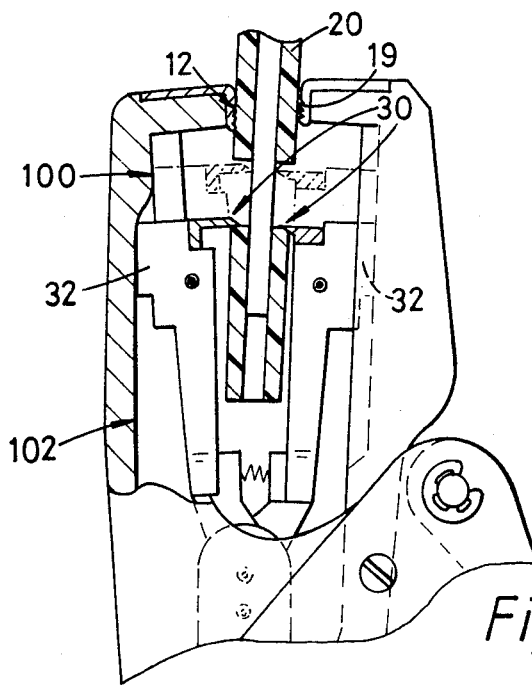

It will be seen that the track portion 100, together with the corresponding portion on the opposite outer jaw serve to act upon the inner jaws to close them during the cutting portion of the operating cycle, and then when the inner jaws are axially displaced by the tie rod, and encounter the set-back portion 102, they are permitted to separate slightly as seen in FIG. 3. Hence, even if the outer jaws are in a convergent position (towards the pivot) when the stripping occurs, the inner jaws do not close further onto the core in the stripping movement. Depending upon the extent of the set-back, and the diameter of the cable, the inner jaws may relax (open) from their maximum penetration position as the movement continues.

The step 104 should be a relatively gentle slope, so that when the stripping operation is completed, and the lever handle 24 is released, the spring 70 can drive the parts back towards the illustrated position. If the step 104 is too abrupt, the inner jaws sliding along the part 102 would stick and not fully return. However, it is possible to combine the step 104 with the portion 102, that is to say to provide a continuous slope or surface which is located closest to the axis of movement of the rod 40 at the end adjacent the part 100 and at a greatest distance at the opposite end.

It will also be seen that with particularly large diameter cables, the outer jaws will converge towards the pivot pin 27, somewhat as shown in FIG. 1. If the invention is not used, then displacement of the inner jaws by the tie rod 40 in the stripping operation forces those inner jaws ever closer to one another which may result in them cutting too far into the cable and damaging the core, or possibly in the tool jamming and being unable to complete the stripping operation. The invention avoids this problem. Consequently it enables a much wider range of cable sizes to be stripped efficiently.

The closing movement of the lever handles towards one another is dependent upon the mechanical advantage, that is to say the length of the lever handle from its pivot, and also the extent of closing movement required. It has been found that a tool provided with the present invention is capable of use with such a wide range of cable sizes that the movement possible from a single lever such as the lever 8 is insufficient if it is made sufficiently long to have adequate mechanical advantage, or alternatively, the movement of the handle is too great so that it needs two hands to operate the tool. The arrangement shown in the drawings having the handle in two parts solves this related problem.

Having now described my invention, what I claim is:

1. A tool comprising a pair of inner jaws pivoted together at one end and each having a cutter extending inward at the other end, a pair of outer jaws pivoted together at one end, and fitting around the inner jaws to permit the outer jaws to be closed to grip a cable extending axially through the inner jaws and to cause the inner jaws to cut through the outer sheath of the cable, and means for displacing the inner jaws relative to the outer jaws to displace the cut sheath, characterized in that at least one of the outer jaws has an inner surface, confronting an inner jaw, along which the inner jaw slides while being displaced, which surface is at a first distance from the axis of the cable at a portion of the surface remote from the pivoted ends of the outer jaws, and at a second and greater distance from said axis at a portion of the surface less remote from the pivoted ends of the outer jaws.

2. A tool as claimed in claim 1, characterized in that the surface portion remote from the pivoted ends of the outer jaws is connected by an inclined portion to the surface portion less remote from the pivoted ends of the outer jaws.

* * * * *